(12) United States Patent
Nakamura

(10) Patent No.: US 6,490,685 B1
(45) Date of Patent: Dec. 3, 2002

(54) STORAGE DEVICE HAVING TESTING FUNCTION AND MEMORY TESTING METHOD

(75) Inventor: Yasuhiro Nakamura, Tokyo (JP)

(73) Assignee: Tokyo Electron Device Limited, Yokohama (JP)

(*) Notice: Subject to any disclaimer, the term of this patent is extended or adjusted under 35 U.S.C. 154(b) by 0 days.

(21) Appl. No.: 09/206,057

(22) Filed: Dec. 4, 1998

(30) Foreign Application Priority Data

Dec. 5, 1997 (JP) .............................. 9-335614

(51) Int. Cl.$^7$ .................. G06F 12/14; H04L 9/10; H04L 9/32
(52) U.S. Cl. .................. 713/193; 713/161; 713/194; 380/264; 380/281; 380/284
(58) Field of Search .................. 380/240, 264, 380/281, 284, 28; 713/193, 190, 161, 192, 194, 201

(56) References Cited

U.S. PATENT DOCUMENTS 4,661,980 A * 4/1987 Byram .................. 380/46
6,078,888 A * 6/2000 Johnson, Jr. .................. 705/1
6,097,818 A * 8/2000 Saito .................. 380/278

* cited by examiner

Primary Examiner—Gilberto Barron
Assistant Examiner—Justin T. Darrow
(74) Attorney, Agent, or Firm—Luce, Forward, Hamitlon & Scripps LLP

(57) ABSTRACT

A flash memory includes an encoded cryptographic key "k" stored therein. A protected ROM, an external access to which is inhibited, includes a decoding program stored therein to decode the cryptographic key "k". The cryptographic key "k" is decoded by using the decoding program. With the cryptographic key "k" as decoded, data is encrypted and stored in the flash memory. Data read out from the flash memory is output after decrypted with the cryptographic key "k." In order to check an area having the decoding program stored therein, data which forms the decoding program is processed by using a hash function stored in the ROM, and a processing result and an expected value are compared with each other. When the processing result and the expected value matches with each other, the aforementioned area is determined as being in a normal condition.

26 Claims, 7 Drawing Sheets

STORAGE DEVICE HAVING TESTING FUNCTION AND MEMORY TESTING METHOD

BACKGROUND OF THE INVENTION

1. Field of the Invention

The present invention relates to a technique for testing a storage device, and more particularly to a technique for testing a storage device which stores an encryption key, information for decoding the encryption key, and information such as a confidential document or the like to be kept secret from an outsider.

2. Description of the Related Art

The necessity to guard confidential information is increasing with the advancement of a computer technology. The importance of an encryption technique for encrypting data before stored or transmitted is becoming higher accordingly. Encrypting data to be stored in a computer external memory and storing the encrypted data in the memory, etc. are also in actual practice. More specifically, an encryption key is stored in advance in a storage device. Data is encrypted with the encryption key and is stored in a memory. Data read out from the memory is decrypted with a decryption key.

Meanwhile, in order to check whether a storage medium is defective or not, it is required to ascertain whether the storage medium can store data and output the stored data properly.

The steps of storing a predetermined test pattern or the like in a memory, reading it therefrom and comparing the readout test pattern and the original test pattern with each other, etc. have been conventionally conducted to ascertain the above.

When the memory is a ROM (read-only memory), the steps of reading out data stored in the ROM and ascertaining whether the readout data and written data match with each other, etc., have been conventionally performed.

However, when a memory device, having a encryption key stored therein, is tested by the above-described method, there is the problem of the encryption key itself being read out to the outside of the memory device.

In order to solve this problem, a memory device having the testing function of reading out stored data from the memory device, converting the readout data and thereafter outputting the converted data to the outside of the memory device, has also been proposed. According also to this method, however, a transformed code is read out to the outside of the memory device. The transformation scheme can easily be prospected, and the encryption key can be prospected as well.

Published Unexamined Japanese Patent Application Kokai No. 8-63402 has proposed a semiconductor IC which has the function of testing a ROM without reading out data stored in the ROM directly to the outside of the IC, by way of comparing data stored in the ROM and an externally supplied expected value with each other and outputting a comparison result. According also to this method, whether confidential data matches with the expected value can be determined per address or the like. Therefore, by performing the test while changing the expected value from one to another, the confidential data can be specified. Furthermore, since the comparison is effected per address, a large amount of checking time is required.

SUMMARY OF THE INVENTION

The present invention has been made in consideration of the above-described circumstances, and it is an object of the present invention to provide a testing method for testing a memory, and a storage device having a testing function.

It is another object of the present invention to provide a testing method, which is suitable for testing a storage device which stores highly confidential data, and such a storage device having a testing function.

According to the first aspect of the present, invention having the above-described objects, there is provided a storage device comprising:

first storage means for storing data;

second storage means including an encoded cryptographic key stored therein;

third storage means including decoding information stored therein to decode the cryptographic key;

fourth storage means including an arithmetic function stored therein to test the third storage means;

writing means for decoding the cryptographic key with the decoding information stored in the third storage means, encrypting externally supplied data with the cryptographic key as decoded and writing the encrypted data in the first storage means;

reading means for decoding the cryptographic key with the decoding information stored in the third storage means, reading data from the first storage means, decrypting the read data with the cryptographic key as decoded and outputting the decrypted data; and comparing means for processing the decoding information stored in the third storage means, by using the arithmetic function stored in the fourth storage means, and for comparing a resultant value and an expected value with each other and outputting a comparison result.

If the storage device was designed so that storage data of the third storage means could be read externally to permit the third storage means to be tested in regard to whether the decoding information had been properly stored therein, there would be the risk that an observer could obtain the decoding information and decode the cryptographic key.

According to the present invention, in light of the above, an arithmetic function for use in the test is stored in the fourth storage means, and the decoding information is processed using the arithmetic function. A resultant value and an expected value are compared with each other, and the output of a comparison result is effected. If the decoding information has been stored properly, the comparison result will indicate an equality between both values. Thus, without the decoding information being output to the outside of the storage device, a determination can be performed as to whether one or more stored cryptographic keys are proper or not.

Furthermore, since the decoding information is processed using the arithmetic function and the resultant value and the expected value are compared with each other, there is no possibility of the decoding information being prospected from the expected value. In the case of comparing the value obtained as a result of the decoding information being processed using the arithmetic function and the expected value with each other, the number of times of comparison is smaller than in the case of comparing per address the decoding information and the expected value with each other. This ensures more speedy processing.

The storage device may further comprise scan means for scanning an address of at least one of the first, second and fourth storage means and reading out a storage content thereof, in order to test whether the above-mentioned at least one of the first, second and fourth storage means is defective or not. The scan means may include inhibiting means for inhibiting an access to the third storage means.

According to the above-described structure, the acts of directly accessing the third storage means and reading out stored data therefrom are also inhibited to maintain the confidentiality of the decoding information.

For example, the first storage means is a rewritable nonvolatile memory, the second storage means is a part of the unrewritable memory, and the third storage means and the fourth storage means are nonvolatile memories.

According to the above structure, a cryptographic key can be stored in the rewritable nonvolatile memory. The cryptographic key may be set to differ depending on storage devices so that even if the cryptographic key of one storage device should be decoded, the cryptographic key of another storage device cannot be prospected.

The expected value described previously may be a value pre-stored in the nonvolatile memory of the storage device or may be an externally supplied value.

The aforementioned arithmetic function may be a one-way function which is, for example, a hash function.

By processing the decoding information with such a one-way function, a single value or processing result is obtained from the decoding information. Meanwhile, however, many pieces of decoding information can be prospected from the processing result and consequently it is difficult to specify the decoding information.

It is preferred that the third storage means and the comparing means be sealed integrally with each other by a resin or the like and be designed so that the contents of communications between the third storage means and the comparing means are not output to the outside of the storage device.

If a data line, etc. for the third storage means were integrated with a data line for another storage means, data might leak to the outside of the storage device while the data was being exchanged between the third storage means and the comparing means. In light of this, the present invention employs the above-described structure to keep the storage content of the third storage means confidential.

According to the second aspect of the present invention, there is provided a storage device comprising:

confidential information storage means including confidential information stored therein;

test information storage means including test information stored therein to test the confidential information storage means;

receiving means for receiving an externally supplied instruction signal which indicates an instruction to test the confidential information storage means; and outputting means for processing the confidential information in response to the instruction signal received by the receiving means, by using the test information stored in the test information storage means, and for comparing a processing result and an expected value with each other and outputting a comparison result.

According also to the above-described storage device, a determination can be performed as to whether the confidential information has been stored properly in the confidential information storage means, without the confidential information being directly read out to the outside of the storage device.

The expected value may be a value pre-stored in the above storage device or an externally supplied value.

The confidential information contains, for example, information for decoding an encoded key which is used to perform at least one of encryption and decryption of data, while the test information contains a predetermined arithmetic function, for example.

It is preferred that the aforementioned arithmetic function be a one-way function, such as a hash function or the like, which satisfies a "many (values which are substituted for the function)-to-one (calculation result)" relationship.

A plurality of confidential information pieces which are, for example, a private key "n" and a public key "e", can be stored in the confidential information storage means. In this case, whether the confidential information pieces have been properly stored or not can be determined based on a comparison result which indicates, for example, whether a relationship of $m^e$ mod n=0 is satisfied or not. In the above relationship, "m" is an externally supplied constant or a constant pre-stored in the storage device.

Further, a private key (d, n) and a public key (e, n) can be stored in the confidential information storage means. In this case, whether the confidential information pieces have been properly stored or not can be determined based on a comparison result which indicates, for example, whether a relationship of $d=m^d$ mod n is satisfied or not. "m" is an externally supplied constant or a constant pre-stored in the storage device.

According to the third aspect of the present invention, there is provided a testing method for testing a memory which stores confidential information and a direct external access to which is inhibited, the testing method comprising steps of:

processing data stored in the memory, by employing a predetermined technique;

comparing a processing result and an expected value with each other; and determining whether a storage content of the memory is proper or not, based on a comparison result.

With the above testing method, the memory can be tested without the storage data of the memory being directly read out to the outside thereof. Since data after processed is used in the comparison, a processing amount can be reduced.

The above-described confidential information is information such as key decoding information for decoding an encoded cryptographic key, a confidential document, etc.

The predetermined technique mentioned above is the technique of processing the data with a one-way function.

According to the fourth aspect of the present invention, there is provided a storage device comprising:

a first memory storing data;

a second memory storing an encoded cryptographic key;

a third memory storing decoding information to decode said cryptographic key;

a fourth memory storing an arithmetic function to test said third memory;

a controller for decoding the encoded cryptographic key stored in said second memory with the decoding information stored in said third memory, encrypting externally supplied data with the cryptographic key as decoded and writing the encrypted data in said first memory, for decoding the cryptographic key stored in said first memory with the decoding information stored in said third memory, reading data from said first memory, decrypting the read data with the cryptographic key as decoded and outputting the decrypted data, and for processing the decoding information stored in said third memory, by using the arithmetic function stored in said fourth memory, and comparing a resultant value of the processing and an expected value with each other and outputting a comparison result to detect said third memory is proper or not.

Said third memory and said controller may be sealed integrally with each other so that contents of communications between said third memory and said controller are not output to an outside of said storage device.

Said controller may scan an address of at least one of said first, second and fourth memories and reading out a storage content thereof, in order to test (check) whether said at least one of said first, second and fourth memories is defective or not. Said controller may inhibit an access to said third memory.

Said first and second memory comprises, for example, a rewritable nonvolatile memory, and said third and fourth memories comprises nonvolatile memories.

Said expected value is one of a value pre-stored in said storage device and an externally supplied value.

The arithmetic function is a one-way function such as a hush function.

DETAILED DESCRIPTION OF THE PREFERRED EMBODIMENT

A storage device having a testing function according to one embodiment of the present invention will now be described exemplifying a flash memory.

Figure 1:
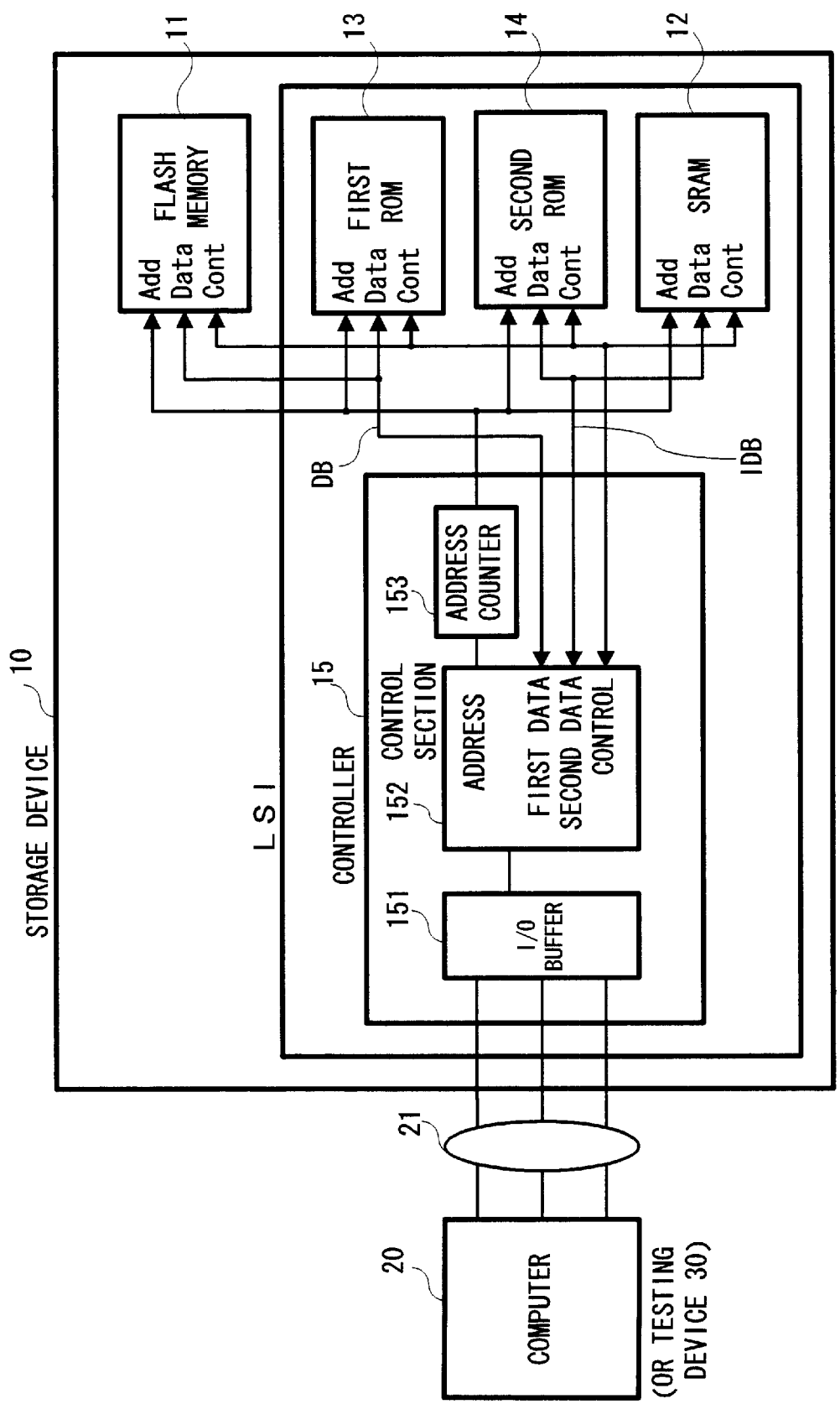
FIG. 1 is a block diagram illustrating the basic structures of a storage device, a computer and a testing device according to an embodiment of the present invention.

FIG. 1 is a diagram showing the structure of a memory device having the testing function according to the first embodiment of the present invention.

As seen from the illustration, the storage device 10 has a flash memory 11, an SRAM 12, a first ROM 13, a second ROM 14 and a controller 15.

The flash memory 11 is a block deletion type storage element which has a plurality of blocks each including memory cells. Data can be written only in blocks from which data items have been deleted in advance.

The flash memory 11 has encrypted data stored therein. This data includes a file allocation table (FAT) and information such as directory information, etc. A data key "k" in an encoded state and which is used to encrypt and decrypt data has been stored in at a key area T1 of a specific address.

The SRAM (Static Random Access Memory) 12 is a volatile high-speed memory which stores data such as an address conversion table, an empty block table, etc. The address conversion table stores a correspondence between the logical address and physical address of data stored in the flash memory 11, the physical address showing the storage location of the data. The empty block table stores the numbers assigned to data writable blocks (the blocks from which data items have already been deleted). The SRAM 12 serves also as a work area for the controller 15. The cryptographic key "k" (in a decoded state) for data encryption and decryption is temporarily stored in the aforementioned work area.

The first ROM (Read-Only Memory) 13 is a nonvolatile memory which stores a program for operating the controller 15.

Figure 2:
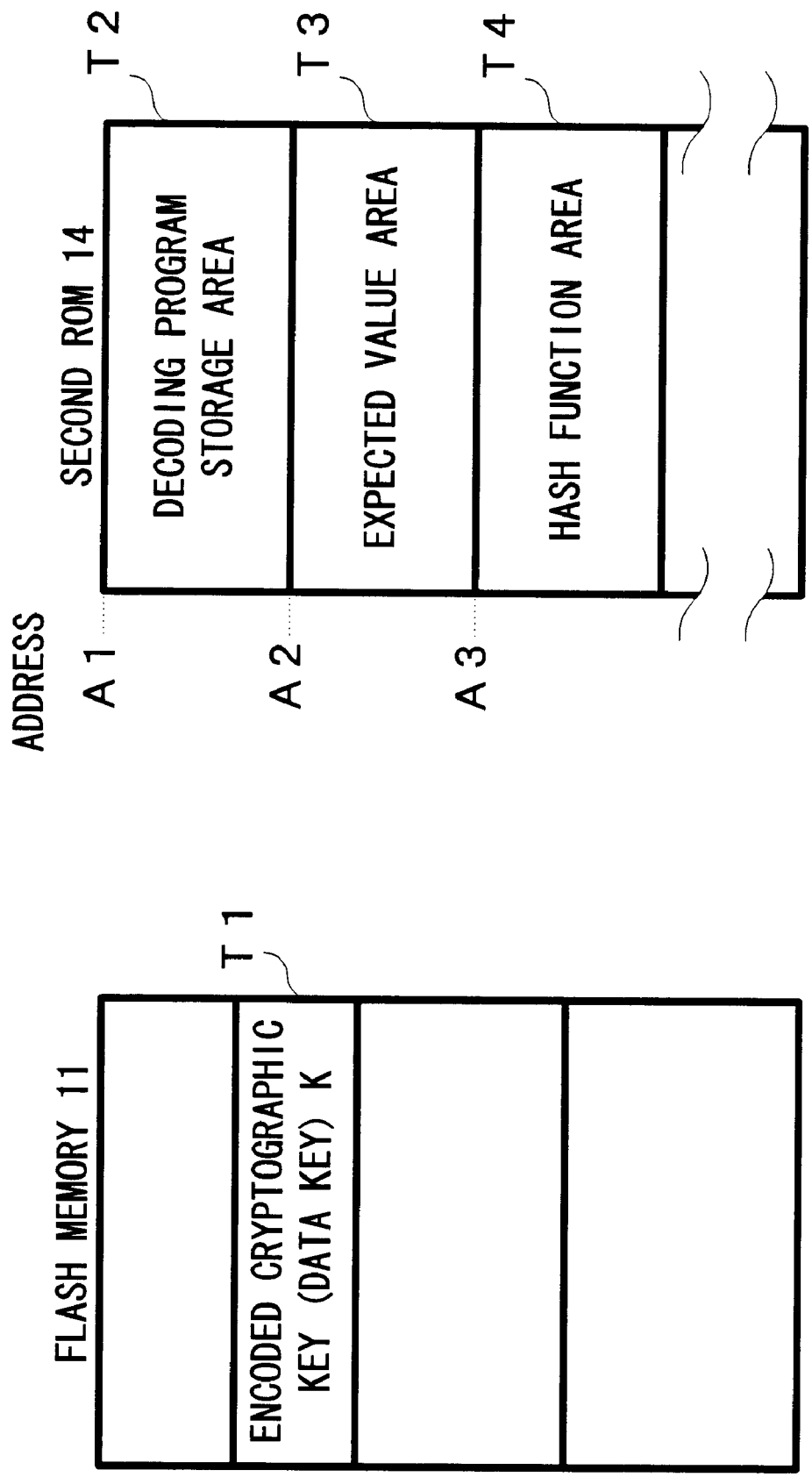
FIGS. 2A and 2B are diagrams illustrating the internal structures of ROMs.

The second ROM 14 is a nonvolatile memory having a decoding program area T2 which stores a decoding program (which is confidential or secret information) for decoding the encoded data key "k", an expected value area T3 which stores an expected value D that will be described later, and a hash function area T4 which stores a hash function, as illustrated in FIG. 2B. The hash function is one example of one-way functions and arithmetic functions.

Different physical addresses have been assigned to locations in the flash memory 11, the SRAM 12, the first and second ROMs 13 and 14.

The decoding program area T2, the expected value area T3 and the hash function area T4 of the second ROM 14 begin at top addresses A1, A2 and A3, respectively.

The controller 15, which includes a CPU (Central Processing Unit), a DSP (Digital Signal Processor), etc., operates in accordance with a program stored in the program area of the first ROM 13, and performs (1) the operation of writing data in the flash memory 11, (2) the operation of reading data from the flash memory 11, and (3) the operation of testing a memory in the storage device 10.

Functionally the controller 15 includes an I/O buffer (an interface circuit) 151, a control section 152 and an address counter 153. The I/O buffer 151 is connected to an external computer 20 (or a testing device 30) or the like via a bus (a data bus and a control bus) 21. The control section 152 is connected to the interface circuit 151.

The address counter 153 is connected to the address terminals Add of the flash memory 11, SRAM 12 and first and second ROMs 13 and 14 via an internal address bus.

Moreover, the control terminal of the control section 152 is connected to the control terminals Cont of the flash memory 11, SRAM 12 and first and second ROMs 13 and 14 via an internal control bus.

Furthermore, the first data I/O terminal of the control section 152 is connected to the data terminals Data of the flash memory 11 and first ROM 13 via a data bus DB, while the second data I/O terminal of the control section 152 is connected to the data terminals Data of the SRAM 12 and second ROM 14 via an internal data bus IDB.

The SRAM 12, the first ROM 13 and the controller 15 are molded integrally with each other so as to form an LSI, and are designed so that data read out from the SRAM 12 and the second ROM 14 is not output to the outside of the LSI.

Explanations will now be made as to how the storage device 10 structured as above, a computer 20 and a testing device 30 operate.

(1) Mutual Authentication

In the case of employing the storage device 10 described above, a mutual authentication is effected between the computer 20 and the storage device 10.

At the time of the mutual authentication, the computer 20 displays a message such as "INPUT PASSWORD" on its display screen (not shown), for example. A user inputs a password in reply to this message.

Based on this password, the driver of the computer 20 and the control section 152 of the controller 15 authenticate mutually. When the driver of the computer 20 and the control section 152 of the controller 15 succeed in the mutual authentication, the use of the storage device 10 is allowed to permit the subsequent access. When they fail in the mutual authentication, the control section 152 of the storage device 10 inhibits the subsequent access.

(2) Writing Operation

Figure 3:
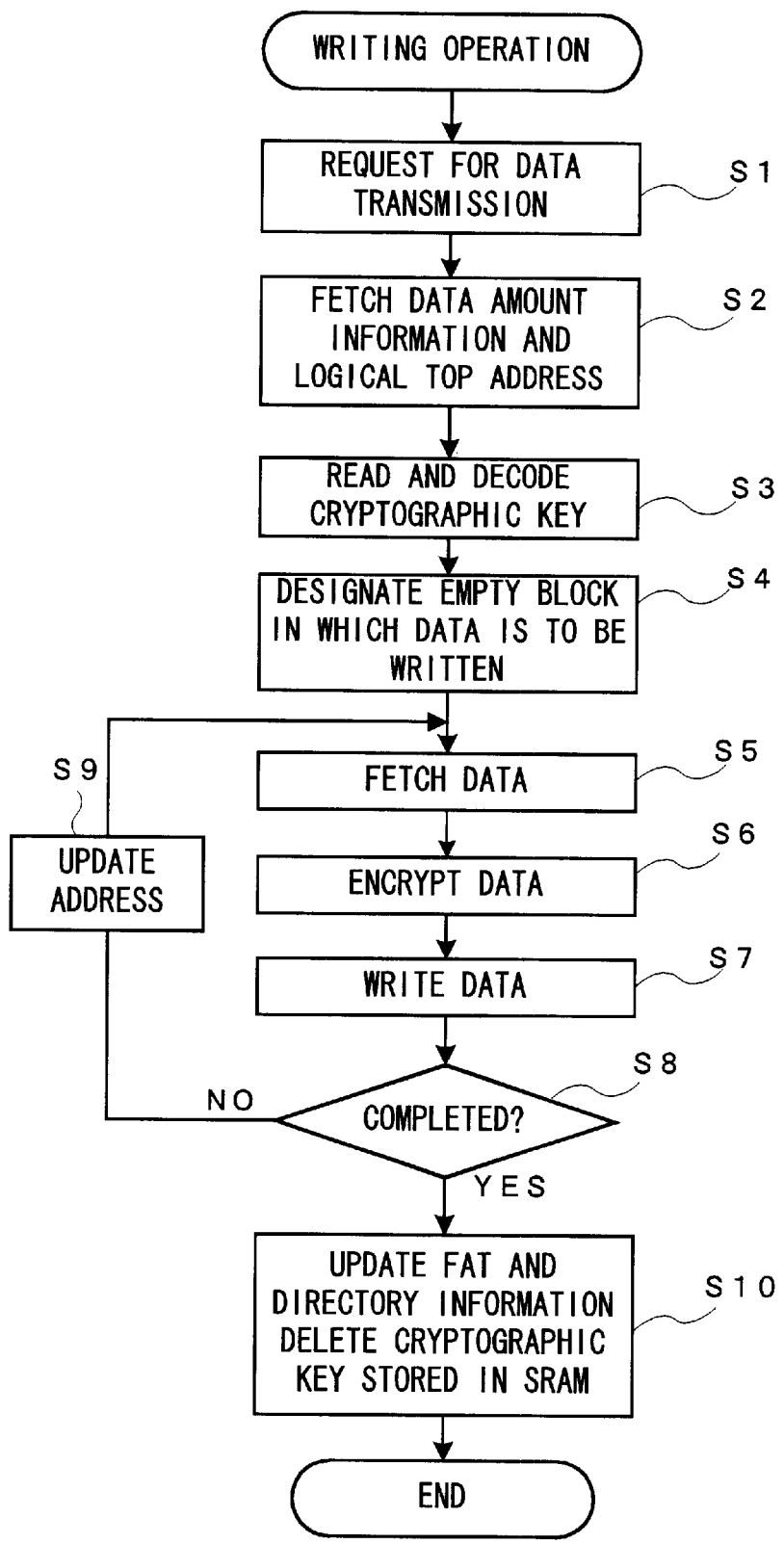
FIG. 3 is a flowchart for explaining the operation of writing data in a flash memory 11.

In the case of writing data in the storage device 10, the computer 20 outputs a writing command to the storage device 10 through the bus 21. The writing command is set in the I/O buffer 151. The control section 152 decodes the writing command, and initiates the process shown in FIG. 3 when the control section 152 determines that the writing command is a data writing command.

Firstly the control section 152 outputs a command, which requests the transmission of to-be-written data, onto the bus 21 through the I/O buffer 151 (step S1).

In response to this request, the computer 20 sends data amount information concerning the total amount of to-be-written data and the corresponding logical top address. Following this, the computer 20 sequentially sends the to-be-written data.

The control section 152 fetches the data amount information and the logical top address sent from the computer 20 through the I/O buffer 151 (step S2).

The control section 152 accesses the flash memory 11, reads out the encoded data key (cryptographic key) "k" from the key area T1 thereof, decodes the data key "k" by using the decoding program stored in the decoding program area T2 of the second ROM 14 in order to generate the plain data key "k", and stores the decoded data key in the SRAM 12 (step S3).

Since the decoding program read out from the second ROM 14 and the decoded data key "k" to be stored in the SRAM 12 are transferred through the internal data bus IDB, the decoding program and the plain data key "k" cannot be accessed at all from the outside of the LSI.

Next, with reference to the FAT, the empty block table, etc. stored in the boot area of the flash memory 11, the control section 152 designates the empty block in which data is to be written (step S4).

Meanwhile, the computer 20 sequentially outputs the to-be-written data onto the data bus 21.

The control section 152 fetches the data supplied from the computer 20 (step S5), and encrypts the fetched data by using the plain data key "k" stored in the SRAM 12 (step S6).

The control section 152 outputs a writing control signal onto the control bus CB, outputs the encrypted data onto the data bus DB, and causes the address counter 153 to generate a writing address so that the encrypted data is written in the flash memory 11 (step S7).

When data writing at a certain address is finished, the control section 152 determines whether the above-described steps have been completed for all data (step S8). When the control section 152 determines that the above steps have not yet been completed for all data, the control section 152 updates the address set in the address counter 153 (step S9), and returns to the step S5 to repeat the same operations as those explained above.

In the case where the currently designated block becomes full, the next empty block is selected in the step S9, and the address of the selected empty block is set in the address counter 153 so that data is written in that block.

When the control section 152 finishes data storage, it updates the empty block table, the FAT and the directory information stored in the flash memory 11. Furthermore, the control section 152 deletes the data key "k" stored in the SRAM 12 (step S10) and terminates processing.

(3) Reading Operation

In the case of reading data from the storage device 10, the computer 20 outputs a reading command to the storage device 10 through the bus 21.

Figure 4:
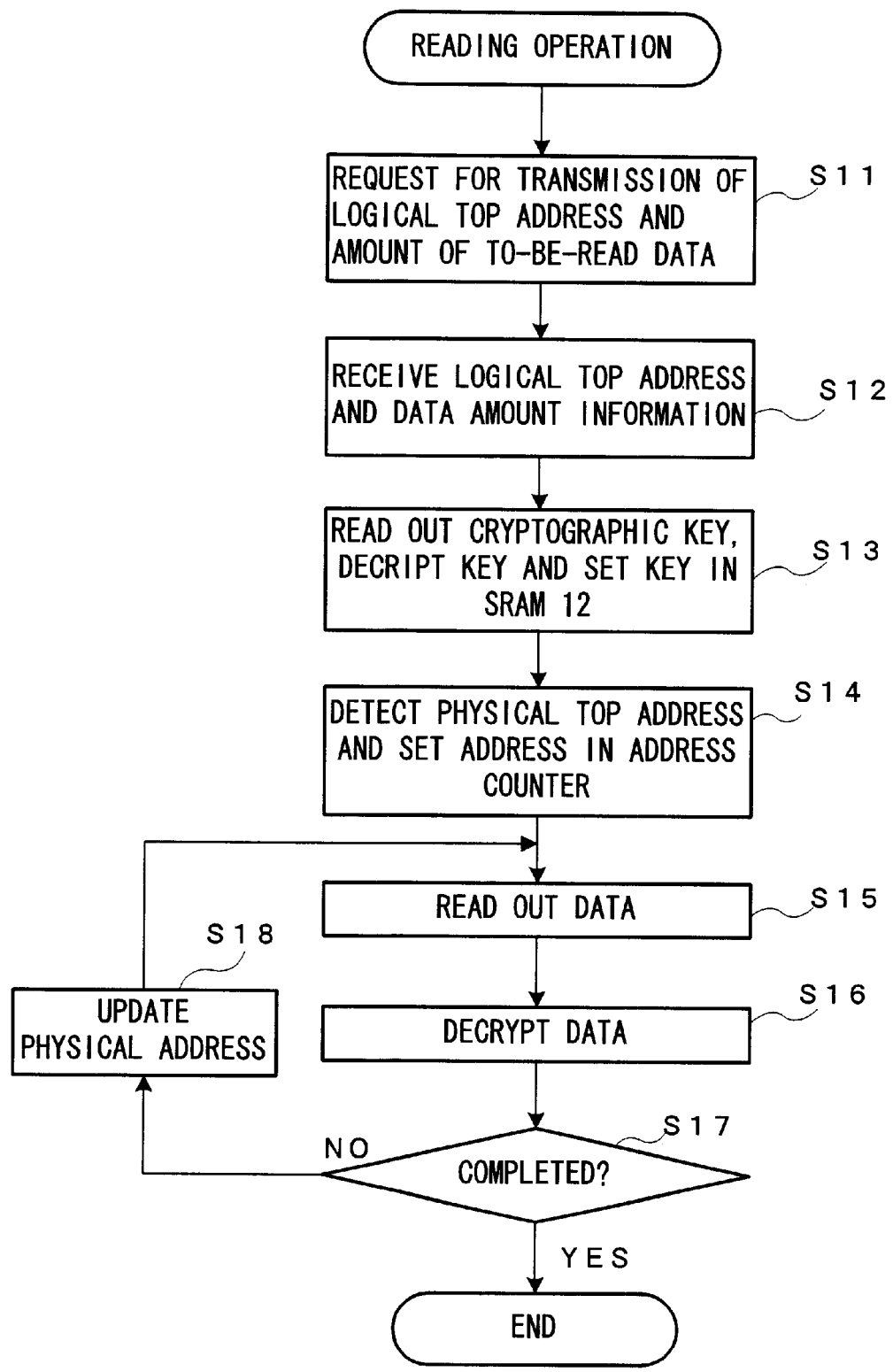
FIG. 4 is a flowchart for explaining the operation of reading out data from the flash memory 11.

When the reading command is set in the I/O buffer 151, the control section 152 decodes this command, and initiates the process shown in FIG. 4 when the control section 152 determines that the command is a data reading command.

Firstly the control section 152 outputs a command, which requests the transmission of a logical top address and data amount information concerning the total amount of to-be-read data, onto the bus 21 through the I/O buffer 151 (step S11).

In response to this request, the computer 20 sends the top address (logical address) of to-be-read data and the data amount information concerning the total amount of to-be-read data to the controller 15 through the bus 21.

The control section 152 receives the top address and the data amount information through the I/O buffer 151 (step S12).

The control section 152 reads out the encoded data key "k" from the key area T1 of the flash memory 11, decodes the key "k" by using the decoding program read out from the decoding program area T2 of the second ROM 14 in order to generate the plain data key "k", and stores the generated key "k" in the SRAM 12 (step S13).

At that time, since the decoding program read out from the second ROM 14 and the decoded data key "k" are transferred through the internal data bus IDB, the decoding program and the decoded data key "k" cannot be accessed at all from the outside of the LSI.

Next, from the FAT and the directory information stored in the flash memory 11, the control section 152 finds out the physical address at which the to-be-read file has been stored, and sets the physical address in the address counter 153 (step S14).

Subsequently, the control section 152 outputs a reading control signal, reads out the data stored at the physical address indicated by the address counter 153 (step S15), decrypts the readout data by using the decoded data key (cryptographic key) "k" stored in the SRAM 12, and sends the decrypted data to the computer 20 through the I/O buffer 151 and the bus 21 (step S16).

The control section 152 determines whether data reading has been completed or not, by determining whether the total amount of readout data is equal to that indicated by the computer 20, etc. (step S17). When data reading has not yet been completed, the control section 152 updates the reading address (the physical address) set in the address counter 153 (step 18).

In the above-described manner, the control section 152 reads out data while sequentially updating the physical address.

When the control section 152 determines that data of the indicated amount has been read, the controller 15 terminates the reading operation.

(4) Testing Operation

Normally, the testing operation is performed after the manufacturing of the storage device 10, before the shipping of the storage device 10, etc. As regards the flash memory 11 and the SRAM 12 arranged in the storage device 10, it is tested whether data has been properly stored therein and whether the data stored therein can be read out properly. Meanwhile, as regards the ROMs 13 and 14, it is tested whether data has been properly stored therein.

In a test mode, the storage device 10 is connected to the external testing device 30 or the like, and the testing device 30 sends a test command to the controller 15.

Figure 5:
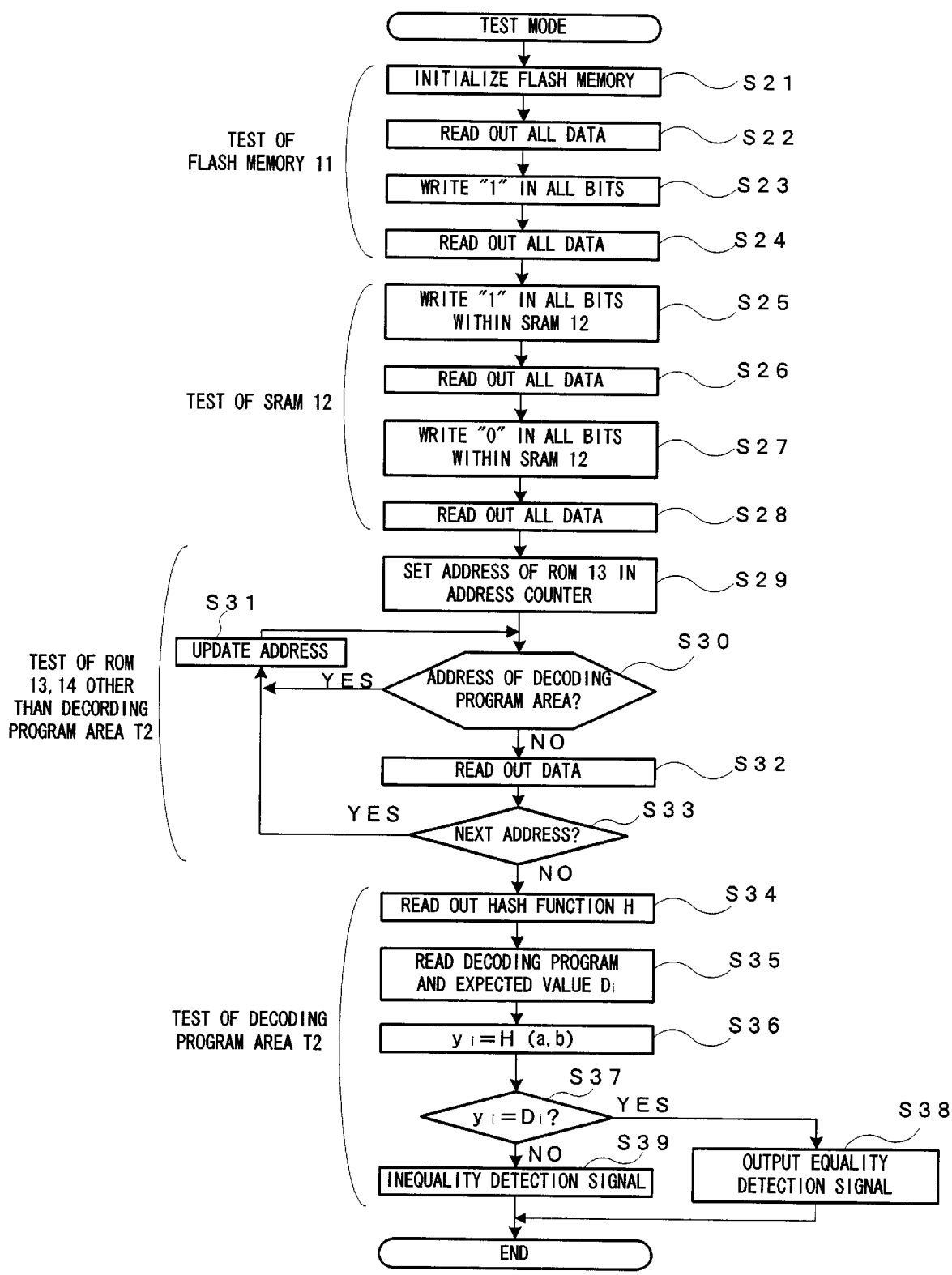
FIG. 5 is a flowchart for explaining a testing operation.

Firstly, in response to the test command supplied through the I/O buffer 151, the control section 152 enters the mode of testing the flash memory 11, as shown in FIG. 5.

(a) Test of Flash Memory 11

The control section 152 initializes the flash memory 11 once (step S21). Following this, the control section 152 sequentially reads out stored data while controlling the address counter 153 so as to sequentially update the address set therein, and outputs the readout data onto the bus 21 through the I/O buffer 151 (step S22). The testing device 30 determines whether all bits are "0." When there is any bit other than "0", the testing device 30 finds out the corresponding physical address, etc.

Having read out all data, the control section 152 writes the value "1" in all bits while sequentially updating the address (step S23). After this, the control section 152 reads out the stored data while sequentially updating the address, and outputs the readout data onto the bus 21 (step S24). The testing device 30 determines whether all bits are "1." When there is any bit other than "1", the testing device 30 finds out the corresponding physical address, etc.

Thus, whether the flash memory 11 is defective or not can be checked by scanning all bits and repeating data the writing and reading operations.

(b) Test of SRAM

When the test of the flash memory 11 is completed, the control section 152 initiates a test of the SRAM 12.

Firstly, the control section 152 writes the value "1" in all bits while controlling the address counter 153 so as to sequentially update the address set therein (step S25). Following this, the control section 152 reads out data stored in the SRAM 12 while controlling the address counter 153 so as to sequentially update the address, and outputs the readout data onto the bus 21 (step S26). The testing device 30 determines whether all bits are "1." When there is any bit other than "1", the testing device 30 finds out the corresponding physical address, etc.

Next, the control section 152 writes the value "0" in all bits while sequentially updating the address (step S27). Subsequently, the control section 152 reads out data stored in the SRAM 12 while sequentially updating the address, and outputs the readout data onto the bus 21 (step S28). The testing device 30 determines whether all bits are "0." When there is any bit other than "0", the testing device 30 finds out the corresponding physical address, etc.

Thus, the SRAM 12 can also be checked by scanning all bits as well.

(c) Tests of ROMs 13 and 14

When the test of the SRAM 12 is completed, the control section 152 initiates the tests of the ROMs 13 and 14.

The tests of the ROMs 13 and 14 are effected by way of reading out data stored therein and determining whether the stored data is proper or not. However, if the data stored in the decoding program area T2 is read out as is, the decoding program may be known to an outsider, entailing the risk of the data key (cryptographic key) "k" being decoded and stolen/used illicitly. In consideration of this, a different test is employed in regard to the decoding program area T2.

First of all, the control section 152 sets the top address of the first ROM 13 in the address counter 153 (step S29).

Then, the control section 152 determines whether the address indicated by the address counter 153 is that of the decoding program area T2 (A1≦address<A2) (step S30). When the control section 152 determines that the address indicated by the address counter 153 is that of the decoding program area T2, the control section 152 updates the address indicated by the address counter 153, without carrying out anything (step S31), and returns to the step S30.

On the other hand, when the control section 152 determines that the address indicated by the address counter 153 is not that of the decoding program area T2, the control section 152 reads out data at the address indicated by the address counter 153 (step S32), and determines whether the next address is present or not. When the control section 152 determines that the next address is present, it updates the address indicated by the address counter 153 (step S31) and returns to the step S30.

In the above-described manner, the control section 152 sequentially reads out data stored in the first ROM 13, while controlling the address counter 153 so as to sequentially update the address set therein, and outputs the readout data onto the bus 21 through the I/O buffer 151 (step S32). The testing device 30 determines whether all of the data read out from the first ROM 13 have a predetermined value, in other words, whether all data have been stored properly.

When the checking of the first ROM 13 is completed, the control section 152 sets the top address (A1) of the second ROM 14 in the address counter at the step S31.

Next, the control section 152 determines whether the address indicated by the address counter 153 is that of the decoding program area T2 (A1≦address<A2) (step S30).

When the control section 152 determines that the address indicated by the address counter 153 is that of the decoding program area T2, the control section 152 updates the address indicated by the address counter 153 and returns to the step S30. Consequently, no data is read out from the decoding program area T2.

On the other hand, when the control section 152 determines that the address indicated by the address counter 153 is not that of the decoding program area T2, the control section 152 reads out data at the location specified by the address (step S32), and outputs the readout data onto the bus 21. Following this, the control section 152 determines whether the next address is present or not (step S33). When the control section 152 determines that the next address is present, it returns to the step S31 and updates the address indicated by the address counter 153, after which the control section 152 repeats the above-described operations.

The testing device 30 determines whether supplied data matches with a predetermined recording pattern. When the testing device 30 determines that the supplied data does not match with the predetermined recording pattern, it finds out the corresponding address, etc.

When the control section 152 determines in the step S33 that the next address is not present, then the control section 152 starts the test of the decoding program area T2, determining that the reading of data from the expected value area T3 and the hash function area T4, etc. has been completed.

Firstly, the control section 152 reads out a hash function H stored in the hash function area T4 (step S34). Next, the control section 152 reads out one expected value or a set of expected values $D_i$ (i=1,2, ... ) stored in the expected value area T3 (step S35).

The control section 152 substitutes data "a" and "b" of predetermined bytes read out sequentially from the decoding program area T2, for the hash function H in order to calculate $y_i$=H (a, b) (step S36). Then, the control section 152 compares the calculation results or values "yi" with the respective expected values Di and determines whether the values "yi" are equal to the respective expected values Di (step S37).

The control section 152 repeats the comparison until all data stored in the decoding program area T2 are read out therefrom. For example, if the decoding program area T2 has a size of 4 k bytes and each of "a" and "b" is 512-byte data, the control section 152 repeats the comparison four times (i=1 to 4).

When all of the calculation results (or the values "yi") are equal to the respective expected values Di, an equality detection signal is sent to the testing device 30 (step S38). When not all the calculation results "yi" are not equal to the respective expected values Di, an inequality signal is sent to the testing device 30 (step 39).

The test is thus completed.

As regards the flash memory 11 and the SRAM 12, the testing device 30 carries out the tests thereof by way of scanning each storage area, storing data therein, reading out the stored data therefrom and comparing the readout data with the expected value.

As regards also the storage areas of the first and second ROMs 13 and 14 except the decoding program area T2, the testing device 30 can determine whether the stored data is proper or not, by way of scanning each storage area, reading out the stored data therefrom and comparing the readout data with the program itself.

As regards the decoding program area T2 of the second ROM 14, it is inhibited in the step S30 to read out the stored data as is from the decoding program area T2, and thus the stored data cannot be checked directly. This prevents the leakage of the decoding program which is confidential information. Whether the stored decoding program is proper or not can be determined based on data indicating the comparison result and supplied from the controller 15. To be specific, when the computation result "y" and the expected value D are not equal to each other, something is wrong with the second ROM 14 and the corresponding chip is excluded.

Thus, according to the above-described testing method, it can be tested whether the memories within the storage device 10 are defective or not, without confidential information such as the decoding program, etc. being made open to an outsider or a person who executes the test.

Figure 6:
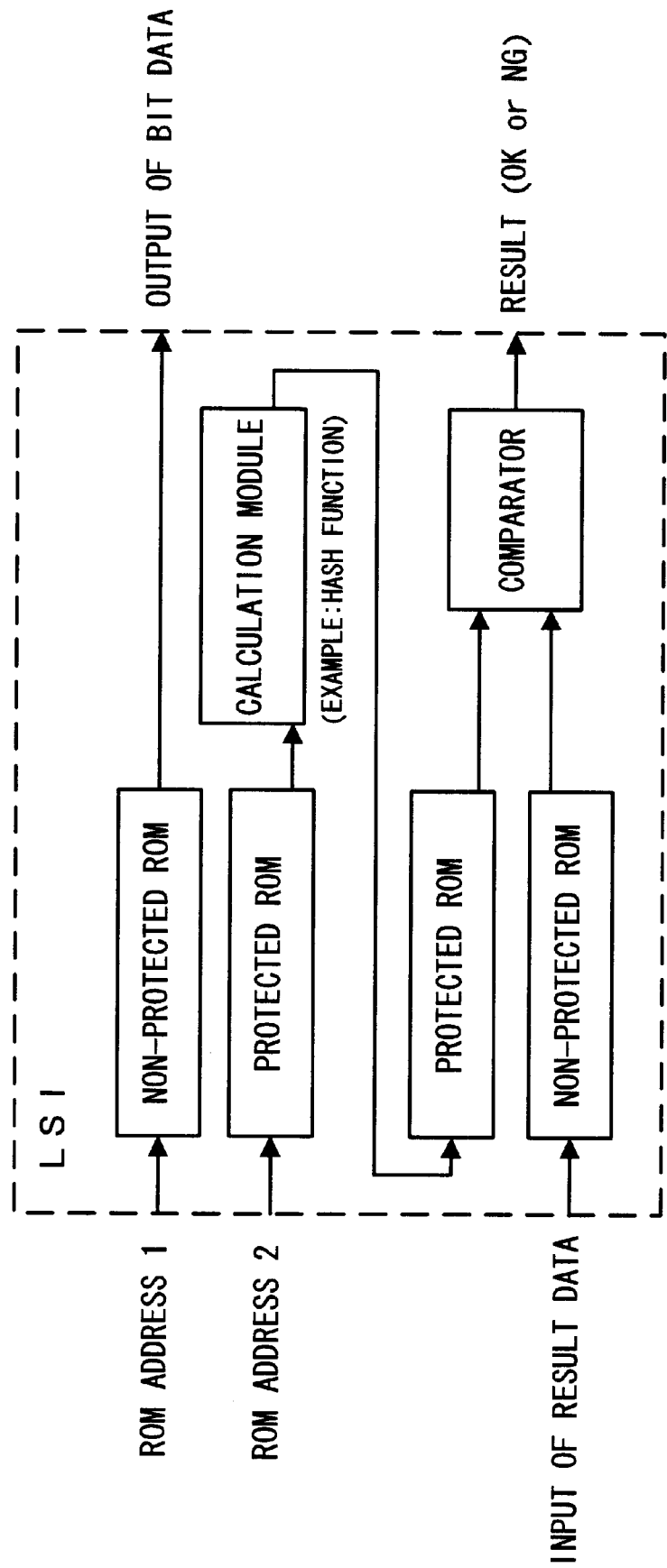
FIG. 6 is a function block diagram for explaining the testing operation.

FIG. 6 illustrates the memory testing function and structure explained above. When a non-protected ROM (an externally accessible ROM) included in the LSI, such as areas other than the decoding program areas of the first and second ROMs 13 and 14, is addressed, data stored therein is read out directly and is compared with an external check pattern, as illustrated in FIG. 6.

On the other hand, when a protected ROM (an externally inaccessible ROM) included in the LSI, such as the decoding program area of the second ROM 14, is addressed, data stored therein is converted by a calculation module with an arithmetic function such as the hush function, and the resultant data is stored in an internal RAM. The content of the RAM is compared with an expected value pre-stored in an internal memory, and the comparison result is output to the outside of the LSI.

In the above explanations, the processor discriminates the validity of the decoding program by determining whether D=y (=H (a, b)) is satisfied or not. However, any other method can also be employed.

For example, the expected value D may be open to the public, and the testing device 30 may supply the expected value to the storage device 10. In this case, the controller 15 performs calculation, substituting the decoding program read out from the decoding program area T2 for the hash function H ( ) read out from the hash function area T4, and determines whether the calculated value is equal to the expected value D supplied from the computer. The controller 15 supplies the determination result to the testing device 30.

The function for testing the decoding program area T2 is not limited to the hash function H. Any arithmetic function may be used. However, it is preferred that the arithmetic function results that a plurality of variables correspond to the same calculation result. According to this structure, the cryptographic key "k" itself cannot be specified even if the expected value D is known to an outsider.

Furthermore, the cryptographic key may be plural in number.

For example, one cryptographic key (a common key) which is common to a plurality of storage devices including the storage device 10 may be stored in the second ROM 14, and another cryptographic key (a peculiar key) which is peculiar to the storage device 10 may be stored in the flash memory 11.

This peculiar key is set based on a random number, etc. at the time of initializing the storage device, for example.

Moreover, the peculiar key may be encoded in accordance with a password, etc., and a program for decoding the encoded peculiar key may be stored in the flash memory.

This invention can be applied to the system where RSA encryption is employed, as well as to the above described memory system employing the data key "k" and common key.

Moreover, in the above explanations, the values "1" and "0" are written in all bits in order to check the flash memory 11 and the SRAM 12. However, a predetermined test pattern, for example, may be written instead. The value "1" or "0" may be further written a plurality of times.

Moreover, according to the above explanations, in response to a test command supplied from the testing device 30, the control section 152 controls the address counter 153 to generate an address so that data is written and read sequentially. However, a control may be performed so that when the test mode is designated, an external bus and an internal bus are connected directly to each other until the test mode is set undesignated and each memory is accessed directly by means of a signal supplied from an external device (tester), while the output of a control signal is being performed.

Figure 7:
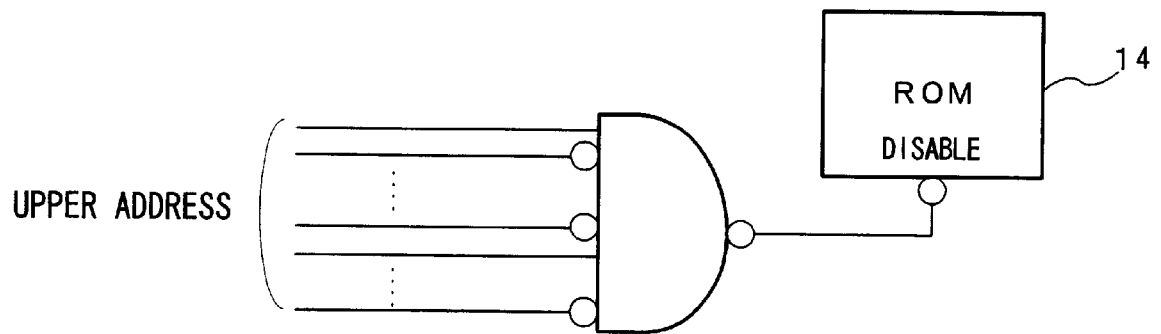
FIG. 7 is a block diagram for explaining an example of a structure for inhibiting an access to an area having confidential information stored therein.

In this case also, it is preferred that when the decoding program area T2 is addressed, address signals representing upper bits of the corresponding address be decoded and supplied to the second ROM 14 so that the ROM 14 is set in an disable state as illustrated in FIG. 7, for example, in order to refuse (inhibit) an external access to the second ROM 14.

Second Embodiment

According to the first embodiment, while data is being written in and read out from the flash memory 11, the decoded data key (cryptographic key) "k" is stored in the SRAM 12 and encryption and decryption are performed using the data key "k."

If, under the above-described condition, an operation clock is stopped to enter the test mode and then data is read out from the SRAM 12, there will be the risk of the data key "k" being detected by an outsider.

Figure 8:
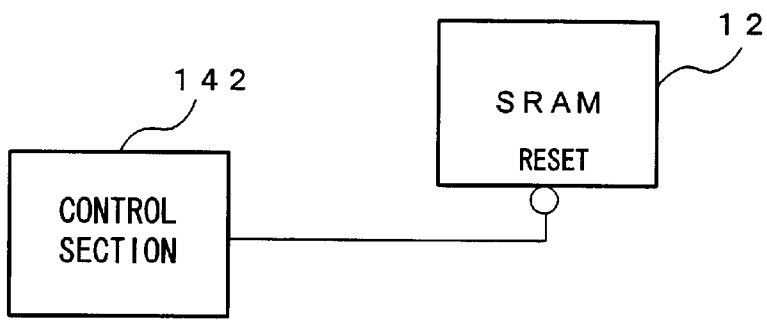
FIG. 8 is a diagram exemplifying a structure for resetting the content of an SRAM in a test mode.

In consideration of this, when the test mode is designated, the control section 152 may send a reset signal to the SRAM 12 in order to reset the SRAM 12 as illustrated in FIG. 8, and thereafter a test depending on an external control may be conducted.

Explanations have been made as to an example in which the present invention is employed to test an area which stores a decoding program for decoding the encoded data key "k" for encrypting data to be stored in the flash memory and for decrypting data stored in the flash memory. However, the present invention is not limited to the above embodiments. The present invention is widely applicable to the tests of nonvolatile storage mediums having confidential data stored therein.

According to the present invention, without confidential information being read out from the storage device, it can be determined whether an area having the confidential information stored therein is defective or not.

What is claimed is:

1. A storage device, which is connectable to a computer and serves as an external memory device of a computer as a whole, comprising:

first storage means for storing data;
   second storage means storing an encoded cryptographic key;
   third storage means storing decoding information to decode said cryptographic key;
   fourth storage means storing an arithmetic function to test said third storage means; and a controller including:
   writing means, responsive to a read instruction from the computer, for decoding said cryptographic key with the decoding information stored in said third storage means, encrypting data supplied from said computer with said cryptographic key as decoded and writing the encrypted data in said first storage means;
   reading means, in response to a write instruction from the computer, for decoding said cryptographic key with the decoding information stored in said third storage means, reading data from said first storage means, decrypting the read data with said cryptographic key as decoded and outputting the decrypted data to the computer; and
   comparing means, in response to a test instruction from a test device, for processing the decoding information stored in said third storage means, by using the arithmetic function stored in said fourth storage means, and for comparing a resultant value and an expected value with each other and outputting a comparison result to the test device.

2. The storage device according to claim 1, wherein said controller includes scan means for scanning an address of at least one of said first, second and fourth storage means and reading out a storage content thereof, in order to test whether said at least one of said first, second and fourth storage means is excellent or defective, said scan means including inhibiting means for inhibiting an access to said third storage means.

3. The storage device according to claim 1, wherein said first storage means comprises a rewritable nonvolatile memory, said second storage means comprises a part of said rewritable memory, and said third storage means and said fourth storage means comprises nonvolatile memories.

4. The storage device according to claim 1, wherein said expected value is one of a value pre-stored in said storage device and a value supplied from the test device.

5. The storage device according to claim 1, wherein the arithmetic function is a one-way function.

6. The storage device according to claim 1, wherein said third storage means and said controller are scaled integrally with each other, and contents of communications between said third storage means and said controller are not output to an outside of said storage device.

7. The storage device according to claim 1, further comprising a bus which connects said controller to the computer or the test device, in said storage device.

8. The storage device according to claim 1, further comprising a bus which connects said controller with said first to fourth storage means.

9. The storage device according to claim 1, wherein said first storage means comprises a flash-memory storing data which is to be accessed by the computer and encrypted with the encrypt key, said second storage means comprises a part of the flash-memory storing encoded encrypt key, said third storage means comprises a read only memory storing decoding program for decoding the encoded encrypt key, and said fourth storage means comprises a read only memory storing a one-way function.

10. A storage device, which is connectable to a computer and serves as an external memory device of a computer as a whole, comprising:

confidential information storage means including confidential information stored therein;
   test information storage means including test information stored therein to test said confidential information storage means;
   receiving means for receiving an externally supplied instruction signal which indicates an instruction to test said confidential information storage means; and
   outputting means for processing said confidential information in response to the instruction signal received by said receiving means, by using the test information stored in said test information storage means, and for comparing a processing result and an expected value with each other and outputting a comparison result.

11. The storage device according to claim 10, wherein said test information contains a one-way function for processing said confidential information.

12. The storage device according to claim 11, wherein said expected value is one of a value pre-stored in said storage device and an externally supplied value received by said receiving means.

13. The storage device according to claim 10, wherein said confidential information contains information for decoding an encoded key which is used to perform at least one of encryption and decryption of data, while said test information contains a predetermined arithmetic function.

14. A testing method for testing a memory which works as an external storage device of computers and stores confidential information and a direct external access to which is inhibited, said testing method comprising steps of:

processing data stored in said memory, by employing a predetermined technique, in said memory;
   comparing a processing result and an expected value with each other, in said memory;
   externally outputting a comparison result from said memory; and
   determining whether a storage content of said memory is proper or not, based on the comparison result.

15. The testing method according to claim 14, wherein said predetermined technique is a technique of processing the data with a one-way function.

16. A testing method for testing a memory which serves as an external storage device of computers and stores key decoding information for decoding an encoded cryptographic key and a direct external access to which is inhibited, said testing method comprising steps of:

processing data stored in said memory, by employing a predetermined technique, in the memory;

comparing a processing result and an expected value with each other, in said memory;

externally outputting a comparison result from memory; and determining whether the key decoding information stored in said memory is proper or not, based on the comparison result.

17. The testing method according to claim 16, wherein said predetermined technique is a technique of processing the data with a one-way function.

18. An external storage device for a computer comprising:

a first memory storing data;

a second memory storing an encoded cryptographic key;

a third memory storing decoding information to decode said cryptographic key;

a fourth memory storing an arithmetic function to test said third memory;

a controller for decoding the encoded cryptographic key stored in said second memory with the decoding information stored in said third memory, encrypting externally supplied data with the cryptographic key as decoded and writing the encrypted data in said first memory, in response to an instruction from the computer, for decoding the cryptographic key with the decoding information stored in said third memory, reading data from said first memory, decrypting the read data with said cryptographic key as decoded and outputting the decrypted data, in response to an instruction from the computer; and for processing the decoding information stored in said third memory, by using the arithmetic function stored in said fourth memory, and comparing a resultant value of the processing and an expected value with each other and outputting a comparison result to a test device, in response to an instruction from the test device.

19. The storage device according to claim 18, wherein said third memory, said controller and said comparator are sealed integrally with each other, and contents of communications between said third memory and said controller are not output to an outside of said storage device.

20. The storage device according to claim 18, wherein said controller scans an address of at least one of said first, second and fourth memories and reading out a storage content thereof, in order to test whether said at least one of said first, second and fourth memories is defective or not, said controller includes inhibits an access to said third memory.

21. The storage device according to claim 18, wherein said first and second memory comprises a rewritable nonvolatile memory, and said third and fourth memories comprises nonvolatile memories.

22. The storage device according to claim 18, wherein said expected value is one of a value pre-stored in said storage device and an externally supplied value.

23. The storage device according to claim 18, wherein the arithmetic function is a one-way function.

24. The storage device according to claim 18, further comprising a bus, which connects said controller to said first to fourth memories, in said storage device.

25. The storage device according to claim 18, further comprising a bus, which connects said controller to the computer or to the test device.

26. The storage device according to claim 18, wherein said first memory comprises a flash-memory storing data which is to be accessed by the computer and encrypted with the encrypt key, said second memory comprises a part of the flash-memory storing encoded encrypt key, said third memory comprises a read only memory (14) storing decoding program for decoding the encoded encrypt key, and said fourth memory comprises a read only memory storing a one-way function.

* * * * *